H. SCHAFER.
STEAM COOKING UTENSIL.
APPLICATION FILED JULY 2, 1920.
1,371,520.
Patented Mar. 15, 1921.
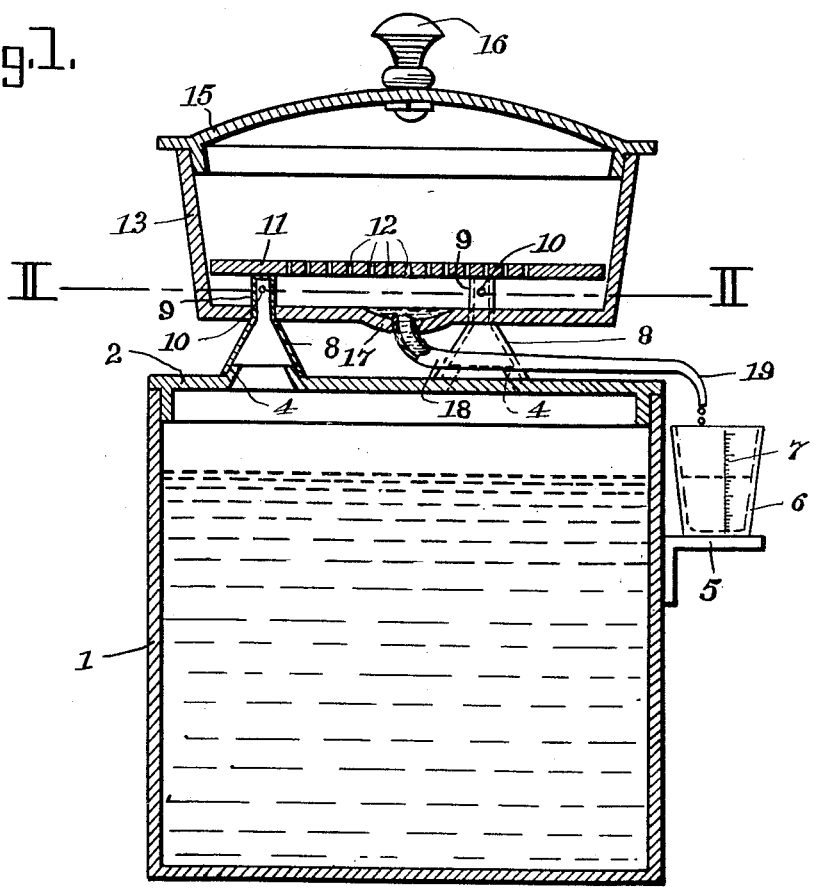
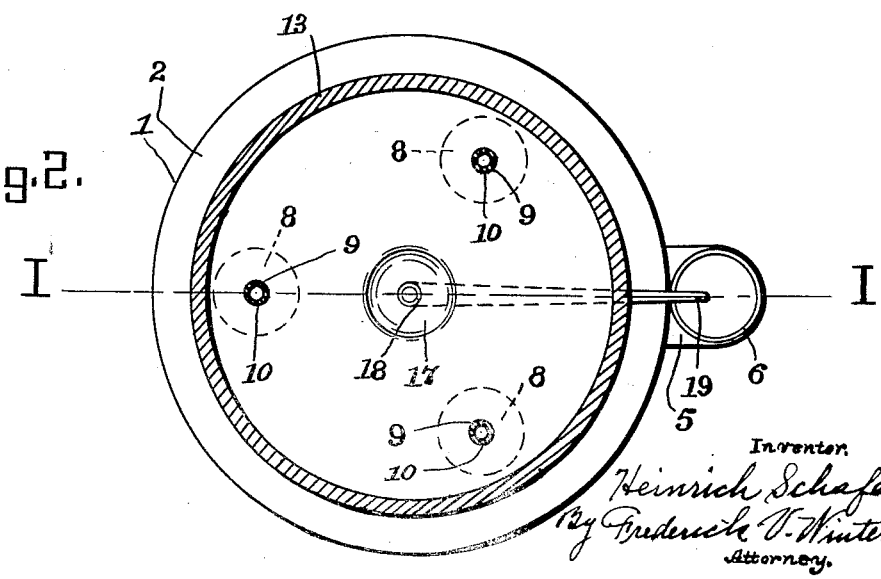
Inventor.
Heinrich Schafer
By Frederick V. Winters
Attorney.

UNITED STATES PATENT OFFICE.

HEINRICH SCHAFER, OF BROOKLYN, NEW YORK.

STEAM COOKING UTENSIL.

1,371,520.  Specification of Letters Patent.  Patented Mar. 15, 1921.

Application filed July 2, 1920. Serial No. 393,540.

*To all whom it may concern:*

Be it known that I, HEINRICH SCHAFER, a citizen of Jugo-Slavia, residing at Brooklyn, in the county of Kings and State of New York, have invented certain new and useful Improvements in Steam Cooking Utensils, of which the following is a full, clear, and exact specification.

This invention relates to steam cooking utensils or vessels, and has for its object to provide an improved and simplified form of appliance for cooking articles of food in an upper receptacle by means of steam generated in a lower vessel.

A special object is to provide improved means for delivering the steam from the lower to the upper vessel, whereby the constant supply of steam will be assured and there will be no danger of the delivery passages becoming clogged or stopped up.

Another special object is to provide improved means for carrying off the water of condensation from the upper or steam vessel, and to utilize said water of condensation for indicating when the food is fully cooked. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a central vertical section through a steam cooker made substantially in accordance with this invention, and Fig. 2 is a horizontal section on the line II—II of Fig. 1.

The water holding vessel 1 may be of any suitable shape and size, and is fitted with a removable cover 2. Formed in said cover are a plurality of conical upwardly extending flanges 4 surrounding openings in the cover through which the steam is adapted to pass.

Fitted over the flanges 4 are inverted funnel-shaped members 8 having cylindrical upper end portions 9 fitted in openings in the upper cooking receptacle 13 the bottom of which rests on the conical portions of said members at the lower extremities of their cylindrical portions. The upper ends of said inverted funnel-shaped members are closed, and openings 10 are provided in the side walls of the cylindrical portions thereof for the escape of the steam. The arrangement of the openings in the sides instead of the tops of said members prevents said openings from becoming clogged up by particles of food, and also permits the tops of said members to be utilized as rests for supporting a plate 11 designed to receive a foodholding pan (not shown) in the vessel 13. Said plate 11 is perforated at 12 to allow the steam to pass freely through it as well as around its edge. The receptacle 13 is fitted with a removable cover 15 having a knob or handle 16 preferably of wood or other non-conductor of heat.

In the center of the bottom of the receptacle 13 there is a dished portion 17 for collecting the water of condensation, and from said dished part of said receptacle bottom a pipe 18 leads to one side of the vessel 1 where it terminates in a downwardly turned spout 19 adapted to deliver the water of condensation into a transparent receptacle 6 preferably made of glass and supported on a bracket 5 secured to the side of said vessel 1. The receptacle 6 carries a graduated scale 7 by means of which the progress of cooking of the food in the receptacle 13 may be determined by the amount of water of condensation discharged into said graduated receptacle 6. In this way it may be easy for the user to see from observation of the amount of water of condensation in said graduated vessel or receptacle when the food placed in the vessel 13 is fully cooked, the quantity of water placed in the vessel 1 and the weight of the food being known.

Having thus described my invention, what I claim as new and desire to secure by Letters Patent of the United States is:—

1. The combination with a vessel to hold water, of a food holding vessel arranged above said water holding vessel, means for conducting the steam formed in the lower vessel into the upper vessel, means for collecting the water of condensation in said upper vessel and conducting it to a point outside both vessels, and a receptacle to receive said water of condensation.

2. The combination with a vessel to hold water, of a food holding vessel arranged above said water holding vessel, means for conducting steam from the lower into the upper vessel, means for collecting the water of condensation in said upper vessel and conducting it to a point outside both vessels, and a receptacle to receive said water of condensation, said receptacle being graduated for the purpose of determining the progress of the cooking process in the upper vessel from the amount of water of condensation collected in the receptacle.

3. The combination with a vessel to hold water, of a food holding vessel arranged above said water holding vessel, steam conducting members extending from the top of the lower vessel through the bottom of the upper vessel and terminating above the bottom of said upper vessel, the upper ends of said members being closed and the sides thereof being perforated, and a food supporting plate resting on the upper ends of said members in the upper vessel.

4. The combination with a vessel to hold water, of a food holding vessel arranged above said water holding vessel, inverted funnel-shaped steam conducting members extending from the top of the lower vessel through the bottom of the upper vessel, said members having lower conical portions and upper cylindrical portions, the latter extending through the bottom of the upper vessel which rests upon the conical portions of said members.

5. The combination with a vessel to hold water, of a food holding vessel arranged above said water holding vessel, inverted funnel-shaped steam conducting members extending from the top of the lower vessel through the bottom of the upper vessel, the lower portions of said members being conical, and conical flanges on the top of the lower vessel fitting in said lower conical portions of the steam conducting members.

In testimony whereof I have signed my name to this specification.

HEINRICH SCHAFER.